United States Patent [19]

Nehmer et al.

[11] Patent Number: 4,684,866

[45] Date of Patent: Aug. 4, 1987

[54] ADAPTIVE CONTROLLER FOR A MOTOR VEHICLE ENGINE THROTTLE OPERATOR

[75] Inventors: Carl A. Nehmer, Grand Blanc; Lary R. Hocken, Flint, both of Mich.

[73] Assignee: General Motors Corporation, Detroit, Mich.

[21] Appl. No.: 852,762

[22] Filed: Apr. 16, 1986

[51] Int. Cl.$^4$ ............................................. H02P 8/00
[52] U.S. Cl. ..................................... 318/696; 318/685
[58] Field of Search ................. 318/696, 685; 123/585

[56] References Cited

U.S. PATENT DOCUMENTS

| | | | |
|---|---|---|---|
| 4,027,215 | 5/1977 | Knight et al. | 318/341 |
| 4,081,736 | 3/1978 | Leenhouts et al. | 318/696 |
| 4,119,901 | 10/1978 | Leenhouts | 318/685 |
| 4,220,904 | 9/1980 | Leenhouts et al. | 318/696 |
| 4,347,821 | 9/1982 | Saito | 123/585 X |
| 4,480,218 | 10/1982 | Hair | 318/696 |

*Primary Examiner*—William M. Shoop, Jr.
*Assistant Examiner*—Saul M. Bergmann
*Attorney, Agent, or Firm*—Mark A. Navarre

[57] ABSTRACT

The phase winding energization frequency of a stepper motor throttle operator is adjusted in relation to a comparison between the actual neutral voltage crossing of back-EMF in the phase windings and a previously determined optimum point of crossing. The energization frequency is increased to increase motor speed when the actual crossing occurs prior to the optimum point, and decreased to decrease motor speed when the actual crossing occurs after the optimum point.

10 Claims, 14 Drawing Figures

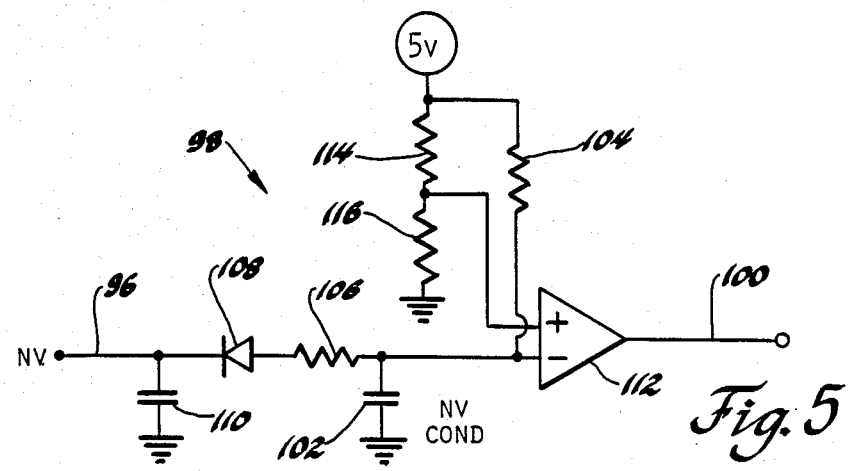
Fig. 5
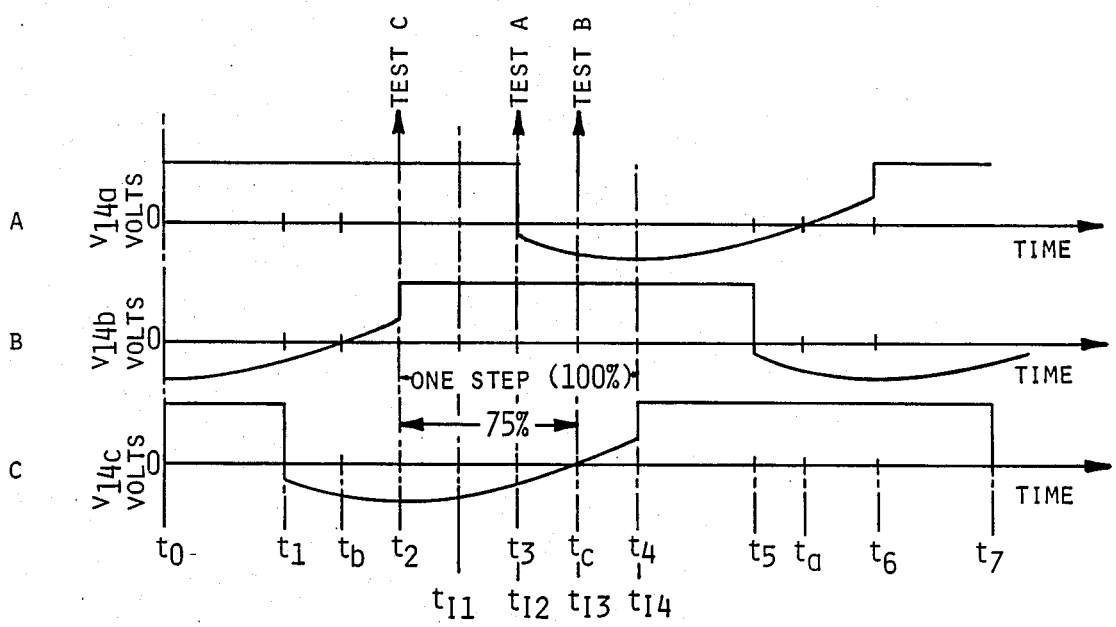
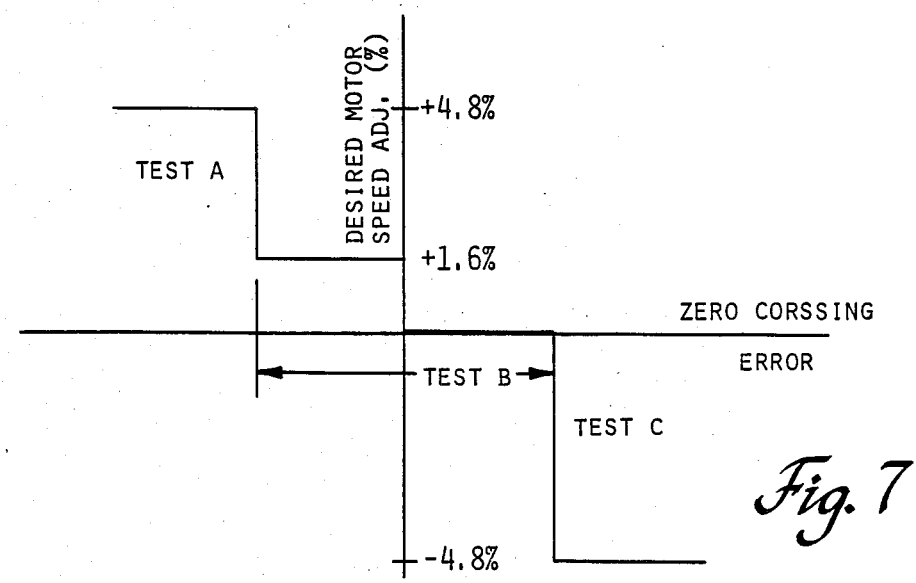
Fig. 7

ADAPTIVE CONTROLLER FOR A MOTOR VEHICLE ENGINE THROTTLE OPERATOR

This invention relates to a stepper motor servo for adjusting the throttle of a motor vehicle engine, and more particularly to an adaptive controller for maximizing the motor speed and torque during operation of the servo.

Stepper motors are well suited to positional servo control applications, primarily because they interface easily with digital controllers and can reliably position a load without the use of a rotor position sensor. The rotor is stable in any of a number of discrete rotary positions, and is driven in a forward or reverse direction in a step-by-step manner by sequentially advancing the phase winding energization at a controllable rate, or frequency. Accordingly, there is substantially no positional drift, and the rotor position can be determined in relation to the history of the phase winding advancement.

In most applications, the objective is to reliably move the load to a desired position in the shortest amount of time. In a stepper motor system, this means that the rotor has to be driven as quickly as possible without losing the synchronism between phase winding energization and rotor position. A critical motor characteristic in this regard is pullout torque—that is, the maximum load torque which may be applied to the rotor without loss of synchronism. Positional error occurs when the load torque exceeds the pullout torque. Typically, the pullout torque decreases with increasing rotor speed, and therefore effectively limits the speed of response of the servo.

Accurate positional control of a motor vehicle engine throttle is particularly difficult because the load is variable over its range of travel. In certain throttle control applications, such as vehicle speed control, the load variation is especially great because the operator of the vehicle can override the servo via the accelerator pedal linkage. The conventional approach is to make a compromise between positional accuracy and speed of response.

The primary object of this invention is to provide an improved stepper motor servo controller for quickly positioning the throttle of a motor vehicle engine in accordance with a position command without incurring significant positional error.

In carrying out this and other objects, the servo controller of this invention adaptively adjusts the motor phase winding energization frequency with load variations so as to achieve the highest motor speed for reliably positioning the throttle at any given level of load torque. The ability of the motor to withstand load torque variation without loss of synchronism is judged by monitoring the voltage induced in the deenergized phase windings (back-EMF) and identifying the zero voltage crossing thereof.

The motor exhibits a restoring torque which tends, within limits, to drive the rotor into alignment with the phase winding energization, and the neutral voltage crossing of the back-EMF in the deenergized phase windings is an indicator of the degree of misalignment. Such crossing is referred to herein as the neutral voltage crossing or the zero crossing. When the rotor leads the stator, the crossing occurs at a later point in the energization cycle than when the rotor lags the stator. Apart from load variations, the amount of rotor lag tends to increase as the motor speed is increased.

In the subject throttle control application, the motor speed can be maximized while retaining the ability to respond to a predetermined level of load variation by permitting the rotor to lag the stator by an empirically determined amount. The empirically determined amount of lag defines an optimum zero crossing point with which a measured zero crossing point is compared. When the measured zero crossing point occurs later than the optimum point, the motor speed is too fast to maintain synchronization, and the winding energization frequency is reduced to reduce the motor speed. When the measured zero crossing occurs earlier than the optimum point, the motor speed can be increased while still maintaining synchronization, and the winding energization frequency is increased to increase the motor speed. In this way, the phase winding energization frequency is adaptively adjusted to changing load conditions, and the motor runs at the highest speed for ensuring reliable positioning of the throttle.

In the illustrated embodiment, the controller periodically samples the induced voltage waveforms to determine if a zero crossing has occurred within a prior interval, and adjusts the energization frequency if required at each such sampling. This approach is referred to herein as a sampling system. Alternately, the controller could continuously measure the induced voltage waveforms to detect zero crossings, and correct the energization frequency if required at each such detection. Such approach is referred to herein as a proportional system.

IN THE DRAWINGS

FIGS. 2–5 are circuit diagrams depicting certain of the functional blocks of FIG. 1 in more detail.

Figure 1:
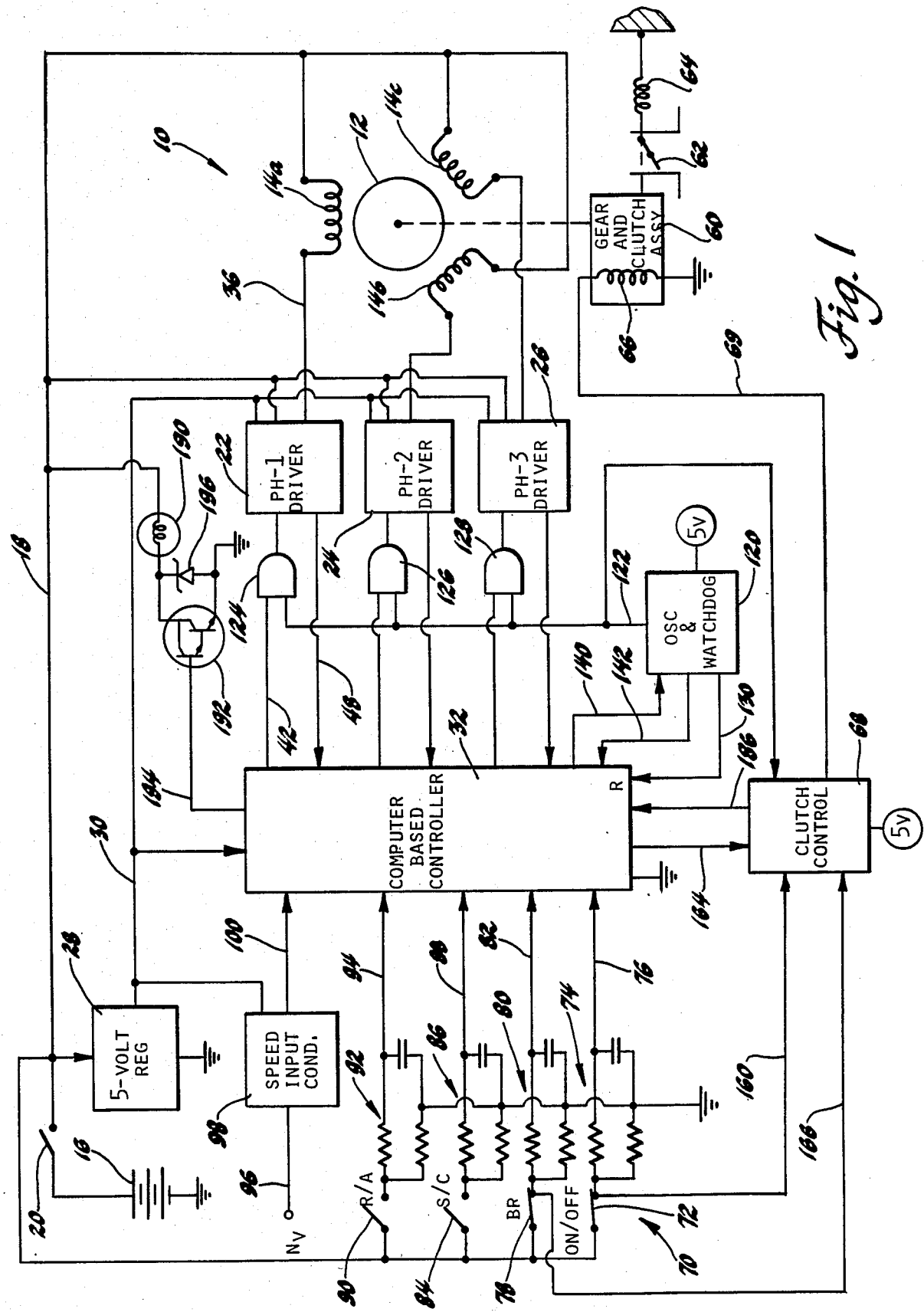
FIG. 1 is a block diagram of a stepper motor and a computer based controller for carrying out the control functions of this invention in connection with a vehicle speed control system.

FIG. 6 graphically depicts the phase winding voltages of the stepper motor of FIG. 1.

FIG. 7 graphically depicts the energization frequency adjustment as a function of the error between the detected zero crossing and the optimum zero crossing as mechanized in a sampling system.

FIGS. 8–14 set forth flow diagrams representative of computer program instructions executed by the computer based controller of FIG. 1 in carrying out the control functions of this invention.

Referring now to the drawings, and more particularly to FIG. 1, reference numeral 10 generally designates a stepper motor having a permanent magnet rotor 12 and three-phase WYE-connected stator windings 14a–14c. One terminal of each winding 14a–14c is connected to the positive terminal of the vehicle storage battery 16 via line 18 and an ignition switch 20. The other terminal of winding 14a is connected to the phase driver 22; the other terminal of winding 14b is connected to the phase driver 24; and the other terminal of winding 14c is connected to the phase driver 26.

The phase drivers 22–26 and various other circuit blocks depicted in FIG. 1 are operated at a relatively low voltage (such as 5 volts) as provided by the voltage regulator 28 on the line 30. The connection of such voltage to certain of the circuit blocks is indicated by the circled 5 V designation.

Figure 3:
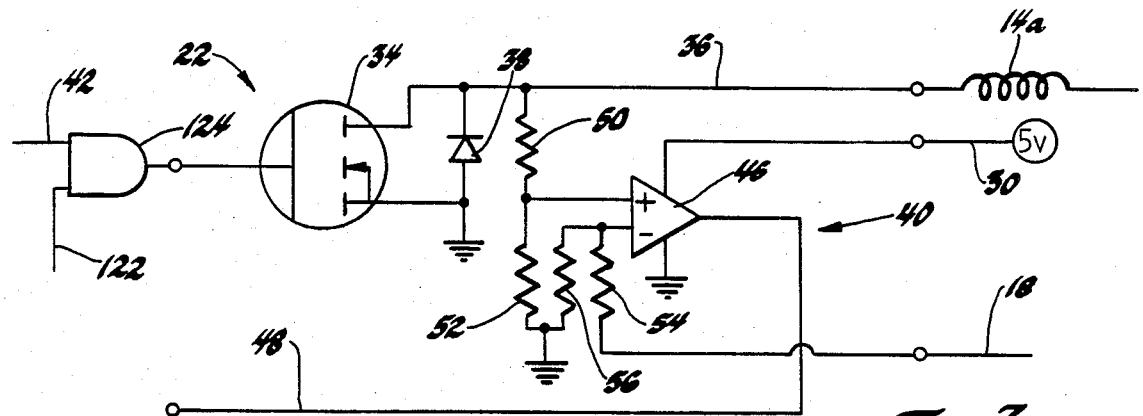

Phase drivers 22–26 each include a power switching device which is turned on and off by a computer based controller 32 to alternately energize and deenergize the respective phase windings 14a–14c in predetermined sequence for producing a rotating magnetic field in the stator of motor 10. The phase drivers 22–26 are essentially the same, the driver 22 being shown in greater detail in FIG. 3. As set forth therein, the phase driver 22 comprises a power FET 34 connected between the phase winding 14a and ground potential via line 36, a freewheeling diode 38 for circulating inductive energy stored in the winding 14a at turn-off, and a zero crossing detector circuit 40. The power FET 34 is biased on and off by the controller 32 via line 42, which is connected to the gate of FET 34 through the AND gate 124.

The zero crossing detector circuit 40 includes a comparator 46 which compares an offset of the phase winding voltage with a reference voltage, thereby to provide controller 32 with a zero crossing indication on line 48. The winding voltage is applied to the noninverting input of comparator 46 through a voltage divider comprising the resistors 50 and 52. The reference voltage is defined by a voltage divider comprising the resistors 54 and 56.

In view of the above, it will be recognized that the point of "zero crossing" as used herein is defined as the point at which the induced phase winding voltage crosses the neutral voltage at the WYE, or common, point of the phase windings 14a–14c. In the illustrated embodiment, the WYE (common) point is maintained at the positive voltage of battery 16, and the zero crossing is detected by comparing the induced voltage with the positive battery voltage. It should be recognized, however, that this invention extends equally to an alternative embodiment wherein the WYE point is grounded and the phase drivers 22–26 selectively connect the phase windings 14a–14c to positive battery voltage. In such case, the "zero crossing" would be detected by comparing the induced voltage with ground potential.

The rotor 12 of stepper motor 10 is mechanically connected through a reduction gearset and clutch assembly 60 to an engine throttle 62. A return spring 64 biases throttle 62 toward a closed position, and motor 10 must overcome the spring force to open throttle 62. The clutch of reduction gearset and clutch assembly 60 is selectively activated by the solenoid coil 66 to make or break the mechanical connection between rotor 12 and throttle 62. The energization of solenoid coil 66 is controlled by the clutch control circuit 68 via line 69, the clutch control circuit being described in greater detail below in reference to FIG. 2. A reduction gearset and clutch assembly meeting the above description is set forth in detail in co-pending U.S. patent application Ser. No. 737,241, filed May 23, 1985, which application is assigned to the assignee of the present invention and which is incorporated herein by reference.

The reference numeral 70 generally designates a plurality of driver input circuits pertinent to vehicle speed control. Each such switch is connected between the downstream side of ignition switch 20 and the computer based controller 32. The ON/OFF switch 72 is connected to the controller 32 through RC network 74 and input line 76. Switch 72 is actuated by the driver to enable or disable the vehicle speed control function. The brake (B) switch 78 is connected to the controller 32 through RC network 80 and input line 82. Switch 78 is normally closed, and is opened whenever the service brakes of the vehicle are operated. The set/coast (S/C) switch 84 is connected to the controller 32 through RC network 86 and input line 88. Switch 84 is normally open and is closed momentarily or continuously by the driver to set a desired vehicle speed or to coast to a slower vehicle speed. The resume/accel (R/A) switch 90 is connected to the controller 32 through RC network 92 and input line 94. Switch 90 is normally open and is closed momentarily or continuously by the driver to resume a previously set speed or to accelerate to a higher vehicle speed.

A vehicle speed signal $N_v$ on line 96 is applied to input conditioning circuit 98 which supplies a vehicle speed feedback signal to controller 32 via input line 100. As set forth in FIG. 5, the input conditioning circuit 98 includes a capacitor 102 which is charged by the 5-volt supply through the resistor 104 and discharged by the vehicle speed signal $N_v$ through resistor 106 and diode 108. The capacitor 110 is for transient suppression. The voltage across capacitor 102 thereby provides an indication of the vehicle speed, and is applied to the inverting input of operational amplifier 112. An offset voltage defined by the voltage divider resistors 114 and 116 is applied to the noninverting input of operational amplifier 112. Accordingly, the output voltage of operational amplifier 112 on line 100 provides an offset indication of the vehicle speed $N_v$.

Figure 4:
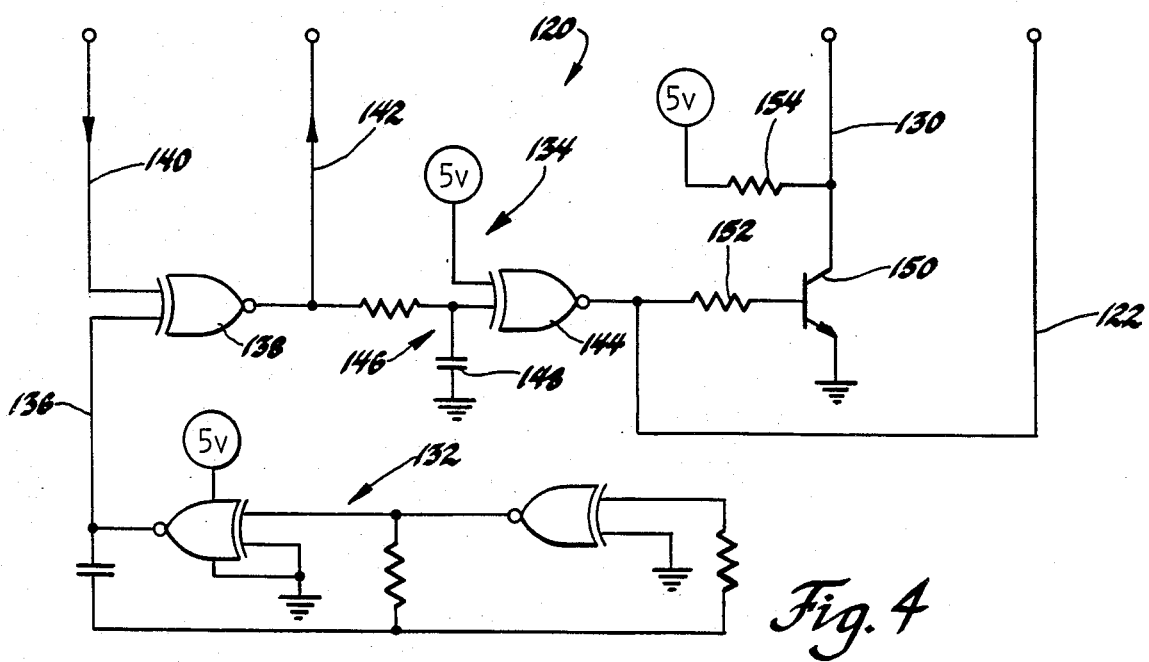

A watchdog circuit 120 cooperates with the controller 32 in a conventional manner to detect the occurrence of a controller malfunction. In the event of a malfunction, the watchdog circuit 120 operates to deenergize the phase windings 14a–14c via line 122 and AND gates 124–128, to disengage the clutch of gearset and clutch assembly 60 via line 122 and clutch control circuit 68, and to reset the controller 32 via line 130. As set forth in FIG. 4, watchdog circuit 120 comprises an RC oscillator 132 and a reset logic circuit 134. Oscillator 132 has an operating frequency of approximately 25 Hz, and its output on line 136 is applied as an input to exclusive NOR gate 138. The other input to the gate 138 is supplied by controller 32 on line 140. The output of gate 138 is applied as an input to controller 32 via line 142, and also as an input to exclusive NOR gate 144 through the RC network 146.

The periodic voltage transitions on line 142 signal the controller 32 to drive the output line 140 to the same voltage level. Until the controller 32 responds, the output of exclusive NOR gate 138 falls to a logic zero voltage potential, allowing the capacitor 148 of RC network 146 to discharge.

In normal operation, the controller 32 quickly responds to the voltage transitions on line 142, and the output of exclusive NOR gate 138 is returned to a logic one voltage potential. Since the output of gate 138 is low for only a short period of time, the capacitor 148 remains charged at a relatively high voltage level, and the output of exclusive NOR gate 144 is maintained at a logic one voltage potential. Transistor 150, which is connected to the output of gate 144 through resistor 152, is maintained conductive, holding the reset input (R) of controller 32 substantially at ground potential.

If a malfunction prevents controller 32 from properly responding to the voltage transitions on line 142, gate 138 remains at a logic zero voltage potential, and capacitor 148 becomes substantially discharged. As a result, the output of gate 144 falls to a logic zero voltage potential. At such point, line 122 signals the AND gates 124–128 to deenergize windings 14a–14c, and the clutch control circuit 68 to disengage the clutch of gearset and clutch assembly 60. In addition, transistor 150 is biased nonconductive, and the resistor 154 raises line 130 to a relatively high voltage potential to effect a reset of the controller 32. The voltage transitions on line 142 continue to occur, and when the controller 32 properly responds thereto, the watchdog circuit 120 operates as described in the previous paragraph.

Figure 2:
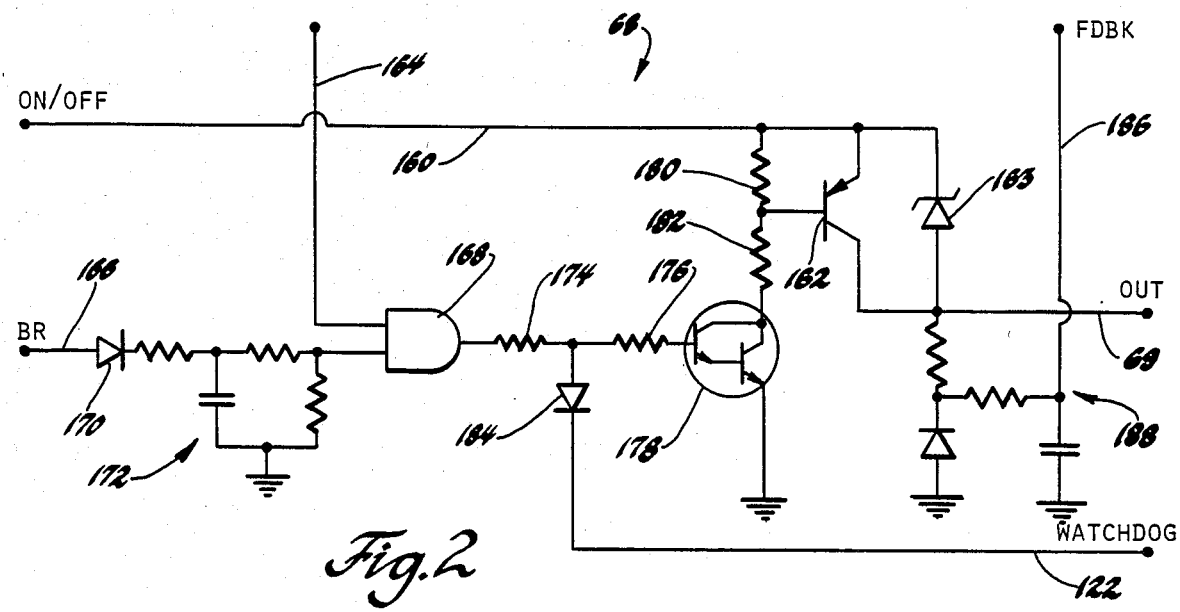

The clutch control circuit 68 depicted in FIG. 2 controls the energization of solenoid coil 66 via line 69. The energization current for coil 66 is supplied from the downstream side of ON/OFF switch 72 through line 160 and the emitter-collector circuit of transistor 162. As such, the motor 10 can only effect adjustment of throttle 62 when the ON/OFF switch 72 is closed. Whenever the switch 72 is moved to the OFF position (opened) the solenoid coil 66 is deenergized, and the throttle 62 returns to a position dependent upon the accelerator pedal linkage (if any) and the return spring 64. A Zener diode 163 protects the transistor 162 when the coil 66 is deenergized.

Whenever the ON/OFF switch 72 is closed, the energization of coil 66 is controlled in accordance with a clutch command signal provided by the controller 32 on line 164 and a brake switch signal on line 166. The brake switch signal is obtained from the downstream side of brake switch 78, which is closed when the service brakes are not in use and open when the service brakes are being applied. The clutch command signal on line 164 is applied directly as an input to the AND gate 168; the brake signal on line 166 is applied as an input to AND gate 168 through the diode 170 and the RC network 172. The output of AND gate 168 is applied through the resistors 174 and 176 to the base terminal of Darlington transistor 178 for controlling its conduction. The output circuit of Darlington transistor 178 is connected to the base terminal of transistor 162 through a divider comprising the resistors 180 and 182.

So long as the ON/OFF switch 72 is closed and the service brakes are not applied, the output of AND gate 168, and hence the conduction of transistors 178 and 162, is controlled in accordance with the clutch command signal on line 164. The coil 66 is energized to engage the clutch if the clutch command signal is high, and deenergized to disengage the clutch if the clutch command signal is low. However, when the service brakes are applied, the brake switch 78 opens, and after a brief delay effected by the RC network 172, the output of AND gate 168 falls to a logic zero voltage level to deenergize the coil 66. A similar override of the clutch command signal on line 164 is effected by the watchdog circuit 120 in the event of a controller malfunction. The line 122 is connected to the junction of resistors 174 and 176 through the diode 184, and serves to independently bias the transistors 178 and 162 nonconductive to deenergize the clutch coil 66.

A feedback signal indicative of the state of clutch control circuit 68 is provided to controller 32 on line 186. The feedback signal is generated by a diode and RC network 188, which provides a filtered indication of the voltage on coil energization line 69.

In addition to controlling the energization of windings 14a-14c and the solenoid coil 66, the controller 32 operates a driver indicator lamp 190. Essentially, the lamp 190 is lit whenever the vehicle speed control function is active. The lamp is connected between the battery supply line 18 and ground potential via the Darlington transistor 192, and controller 32 controls the conduction of transistor 192 via line 194. The Zener diode 196 protects transistor 192 from damage due to voltage transients.

Graphs A-C of FIG. 6 depict idealized voltage waveforms for one complete energization sequence of the motor phase windings 14a-14c on a common time base. Graph A depicts the voltage $V_{14a}$ appearing across winding 14a; Graph B depicts the voltage $V_{14b}$ appearing across winding 14b; and Graph C depicts the voltage $V_{14c}$ appearing across winding 14c. Winding 14a is energized during the interval $t_0$-$t_3$; winding 14b is energized during the interval $t_2$-$t_5$; and winding 14c is energized during the intervals $t_0$-$t_1$ and $t_4$-$t_7$. The winding voltages which occur between the energization intervals are induced by the rotation of rotor 12, and is conventionally referred to herein as induced or back-EMF. The back-EMF appearing across each phase winding 14a-14c is negative in polarity just after the respective winding is deenergized, and then becomes positive in polarity before the winding is energized again. The point at which the back-EMF changes from negative to positive polarity is referred to herein as the point of zero crossing.

The present invention is founded on the notion that in control applications having variable load torque, there is an optimum point of zero crossing which may be empirically determined for maximizing the motor speed for the existing load torque while retaining the ability to respond to a predetermined level of load torque variation. The phase winding energization frequency—that is, the energization sequence repetition rate—is adjusted in closed loop fashion so that the actual point of zero crossing in each phase winding 14a-14c occurs at or near the optimum point of zero crossing. The predetermined level of load torque variation the motor can respond to depends on the speed of response of the frequency adjustment. In physical terms, the point of zero crossing corresponds to the amount by which the rotor 12 lags the phase sequence of the stator winding energization.

In a mechanization of the invention substantially as depicted in FIG. 1, the energization frequency was controlled so as to cause the zero crossing to occur approximately 75% of the way through a respective energization sequence step. In this regard, a complete motor step is defined as the interval between the beginning of energization in two successively energized phase windings. The intervals $t_0$-$t_2$, $t_2$-$t_4$, and $t_4$-$t_6$ each define a complete energization sequence step. Accordingly, the zero crossing for phase winding 14a occurs at time $t_a$ as shown in Graph A of FIG. 6. Similarly, the zero crossing for winding 14b occurs at time $t_b$, and the zero crossing for winding 14c occurs at time $t_c$—in each case, 75% of the way through the respective energization sequence step. While it will be recognized that the optimum zero crossing point depends on load conditions, the target zero crossing of 75% is referred to herein as the optimum point of zero crossing.

If the actual point of zero crossing occurs prior to the optimum point of zero crossing, the motor 10 could handle the load torque at a higher speed. In such case the controller operates to increase the winding energization frequency to increase the motor speed. If the actual point of zero crossing occurs after the optimum point, the motor speed is too great to reliably handle the load torque without loss of synchronization (slippage), and the phase winding energization frequency is reduced to reduce the motor speed. In this way, the phase winding energization frequency is adaptively adjusted to changing load conditions, and the motor 10 runs at the highest speed for ensuring reliable positioning of the throttle 62.

In the embodiment of this invention illustrated herein, the controller 32 periodically executes a routine that tests for zero crossings and adjusts the energization frequency if required. In particular, three zero crossing tests are performed in each motor step. The first test, referred to herein as TEST C, occurs at the onset of the motor step—that is, when a respective phase winding is first energized. If the back-EMF zero crossing of that phase has not yet occurred, the motor speed is much too fast, and the controller 32 effects a relatively large decrease in the motor speed command, referred to hereinafter as the desired motor speed.

The second test, referred to herein as TEST A, is only performed during motor starting, and occurs at the midpoint of the motor step. If the back-EMF zero crossing of the upcoming phase winding (that is, the phase winding about to be energized) has already occurred, the motor speed is much too slow, and the controller 32 effects a relatively large increase in the desired motor speed.

The third test, referred to herein as TEST B, occurs at the desired point of zero crossing—that is, 75% of the way through the motor step. If the back-EMF zero crossing of the upcoming phase winding has occurred, the motor speed is a little too slow, and the controller 32 effects a relatively small increase in the desired motor speed. No decrease is effected if the zero crossing has not yet occurred. Referring by way of example to the motor step defined by the interval $t_2-t_4$ in FIG. 6, the TEST C pertains to the occurrence of zero crossings prior to time $t_2$, the TEST A pertains to zero crossings prior to time $t_3$, and the TEST B pertains to zero crossings prior to time $t_c$.

In FIG. 7, the adjustments to desired motor speed are graphically illustrated as a function of the amount by which the sensed zero crossing deviates from the optimum zero crossing—in other words, the zero crossing error. Negative error indicates that the sensed zero crossing occurred prior to the optimum zero crossing; positive error indicates that the sensed zero crossing occurred after the optimum zero crossing. As shown in the graph, the increases and decreases in desired motor speed effected by TEST A and TEST B amount to an adjustment of approximately 4.8%. The increase effected by TEST B amounts to an adjustment of approximately 1.6%. These values were chosen so as to maximize stability and motor acceleration during starting, and also to facilitate implementation of the speed adjustments with a digital computer.

Prior to the starting of the motor, the rotor 12 is stationary and no back-EMF is induced in the phase windings 14a-14c. To enable starting, desired motor speed is preset to a relatively low starting rotational rate. If forward motor rotation is required, the motor must work against the throttle return spring 64, and the starting speed is initialized at a relatively low value such as 50 steps per second. If reverse motor rotation is required, the throttle return spring 64 aids the motor, and the starting speed is initialized at a higher value, such as 100 steps per second. During the starting period when the actual motor speed is less than or equal to the starting speed, all three zero crossing tests A, B, and C are enabled so as to adjust the desired motor speed in accordance with the ability of the motor to accelerate the load. However, the TEST A is inhibited when the motor speed increases above the starting speed. This is because at higher motor speeds, the interrupts, and therefore the zero crossing tests, occur at a relatively high frequency. Under such conditions, large increases in the desired motor speed are both unnecessary and undesirable in terms of stability. The large decreases in desired motor speed effected by TEST C are retained in order to retain the ability of the motor to respond to large increases in the load torque without substantial loss of synchronism.

Figure 8:
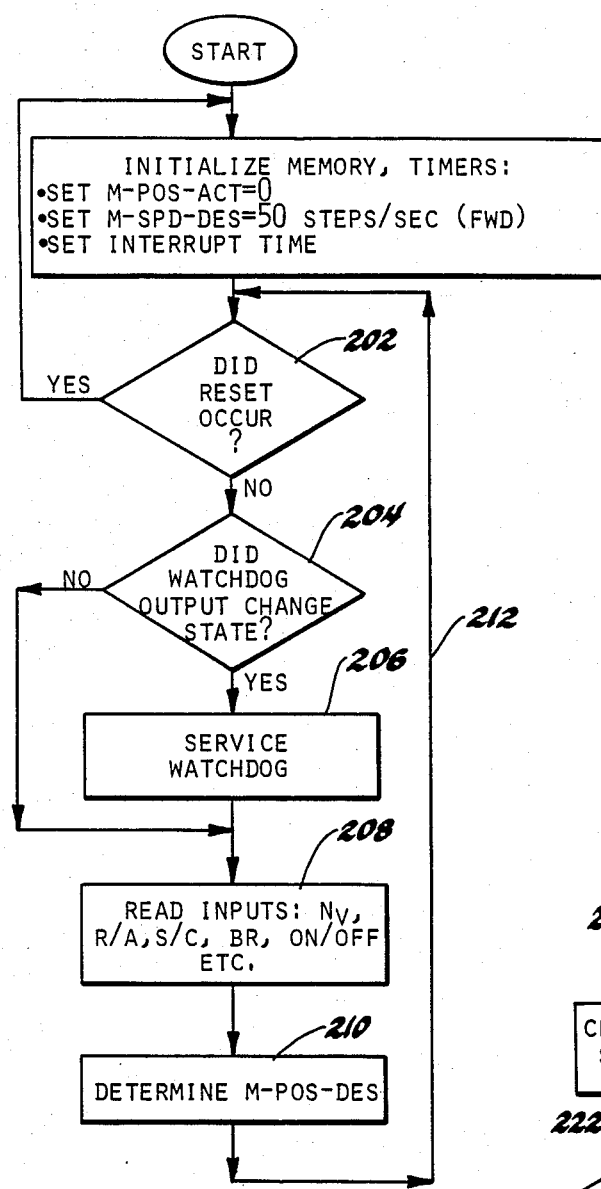

The flow diagrams of FIGS. 8-14 represent computer program instructions executed by the computer based controller 32 in carrying out the control functions of this invention. The flow diagram of FIG. 8 represents a main or background program loop which reads the system inputs, services the watchdog circuit 120, and determines the desired motor position. The remaining flow diagrams pertain to an interrupt service routine and various subroutines called thereby in response to a timer generated interrupt to update the motor status and to adjust the desired motor speed, if necessary.

Referring now more particularly to FIG. 8, the reference numeral 200 designates an initialization routine executed at the initiation of each period of vehicle operation for setting various operating parameters and registers to an initial value. For example, the actual motor position register, M-POS-ACT, is set equal to zero; the desired motor speed register, M-SPD-DES, is set equal to the forward starting speed of 50 steps/second; and the interrupt timer is initialized to one-quarter step, based on the starting speed of 50 steps/second.

The flow diagram blocks 202-206 service the watchdog circuit 120. Decision block 202 directs the reexecution of the initialization block 200 if watchdog circuit 120 signals a reset via line 130. If a reset has not occurred, decision block 204 checks the watchdog circuit output line 142 to determine if a voltage transition has occurred. If so, the instruction block 206 is executed to service the watchdog circuit 120 by generating a corresponding voltage transition on the line 140. As described above in reference to FIG. 4, such servicing of watchdog circuit 120 prevents the generation of a reset signal on line 130.

The instruction block 208 serves to read the various inputs described in reference to FIGS. 1-5, including the vehicle speed signal $N_v$, the driver operated switch information, and the zero cross detector information. The instruction block 210 represents a routine which evaluates the various inputs and determines a desired motor position M-POS-DES for bringing the actual vehicle speed into correspondence with the desired vehicle speed. This algorithm may be fairly conventional and is based, at least in part, on the magnitude and direction of vehicle speed error, and previously determined empirical relationships between throttle position and vehicle accelerating torque. Further detail pertaining to the development of the desired motor position is not given herein, as this invention pertains primarily to the remainder of the control algorithm. Following the execution of block 210, the blocks 202-210 are reexecuted, as indicated by the flow diagram line 212.

Figure 9:
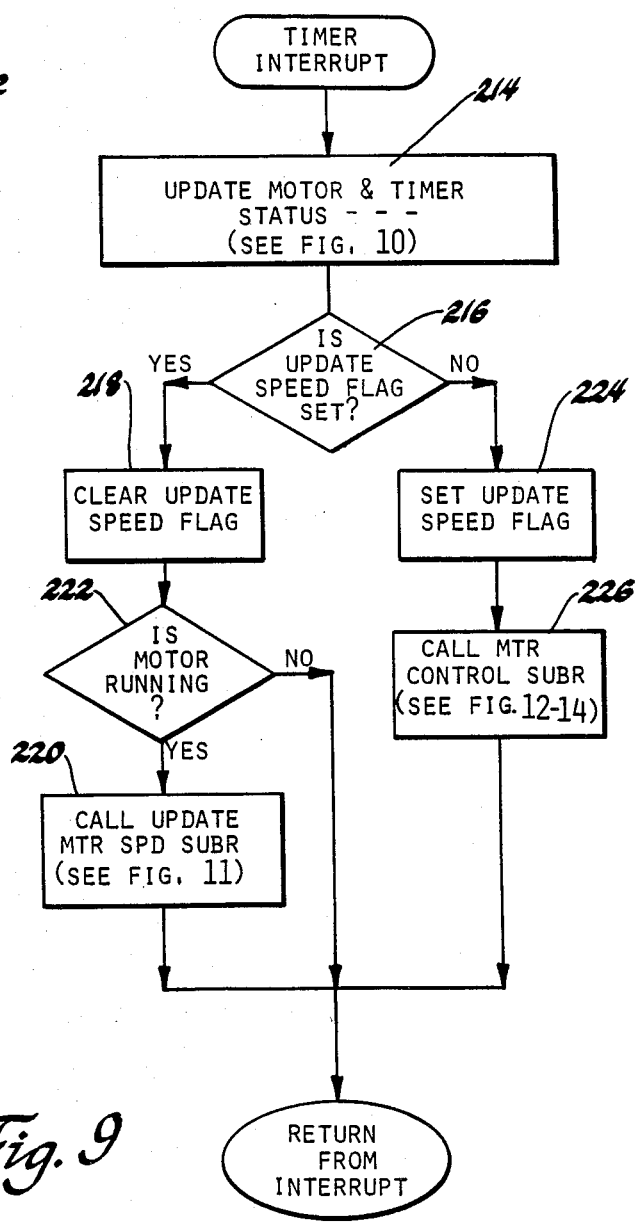

The flow diagram of FIG. 9 broadly sets forth the routine executed by controller 32 in response to the timer generated interrupts. As set forth above, the interrupts occur four times per motor step. At each such occurrence, the motor and timer status is updated, as indicated generally at block 214. This function is set forth in greater detail in the flow diagram of FIG. 10, as indicated.

Thereafter, the decision block 216 is executed to determine if the UPDATE SPEED FLAG is set. If so, the instruction block 218 is executed to clear the UPDATE SPEED FLAG so that in the next execution of the interrupt service routine, decision block 216 will be answered in the negative. In addition, the instruction block 220 is executed to call a subroutine, UPDATE MTR SPD, for updating the motor speed if the motor 10 is running, as determined at decision block 222. The UPDATE MTR SPD subroutine is set forth in greater detail in the flow diagram of FIG. 11, as indicated.

If the decision block 216 is answered in the negative, the instruction block 224 is executed to set the UPDATE SPEED FLAG so that in the next execution of the interrupt service routine, decision block 216 will be answered in the affirmative. In addition, the instruction block 226 is executed to call a subroutine, MTR CONTROL, for advancing phase winding energization and performing motor control. The MTR CONTROL subroutine is set forth in greater detail in the flow diagrams of FIGS. 12-14, as indicated. After the appropriate subroutine has been executed, the controller 32 returns to execution of the main or background loop described above in reference to the FIG. 8.

Figure 10:
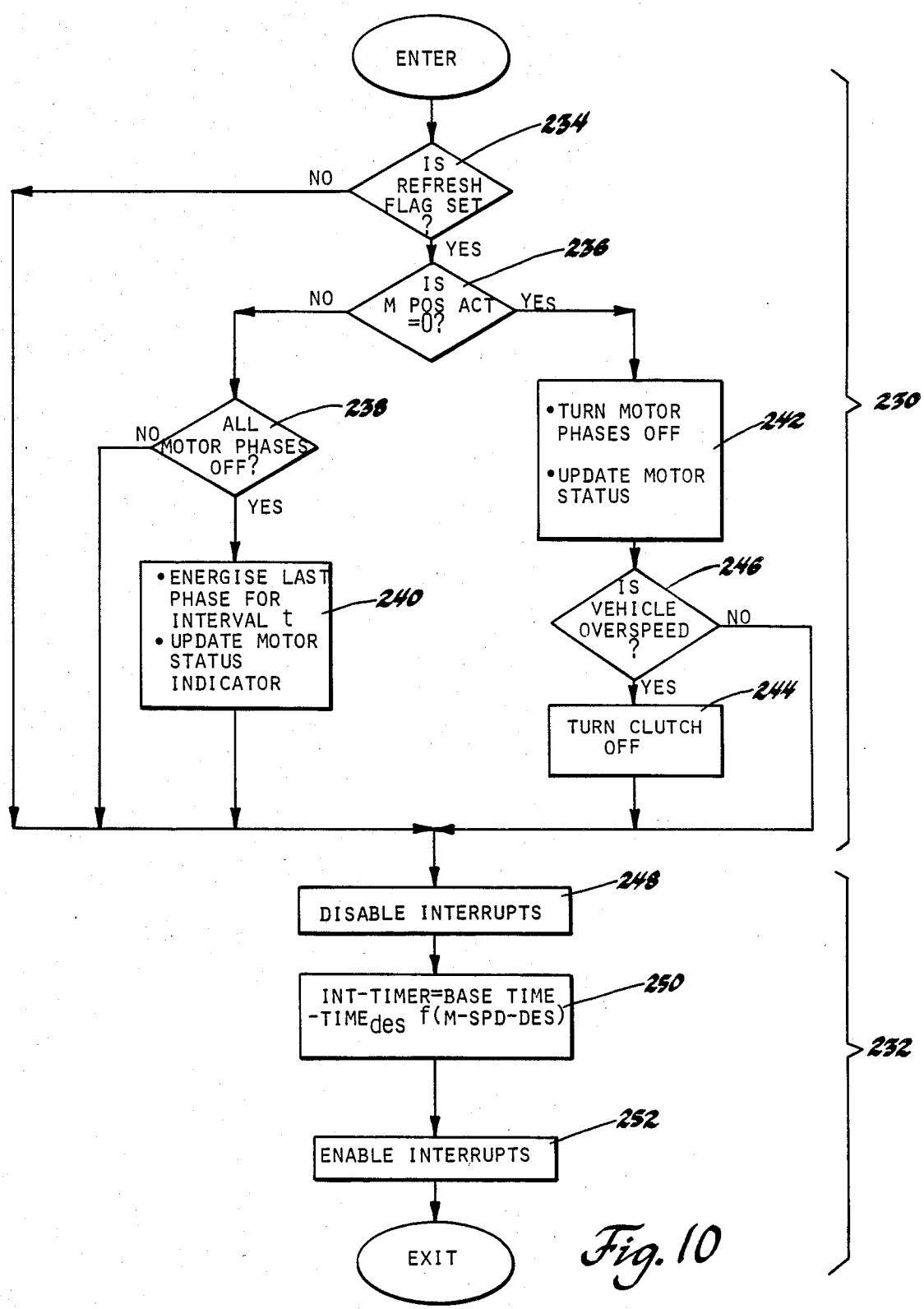

The flow diagram of FIG. 10 is executed at each timer interrupt to update the motor and interrupt timer status, as indicated above in reference to FIG. 9. The flow diagram comprises a refresh portion 230 and a timer adjustment portion 232. The refresh portion 230 determines if the motor has been stopped, as indicated by the status of a REFRESH flag. If the decision block 234 determines that the REFRESH flag is not set (motor running), the remainder of the refresh portion 230 is skipped. If the REFRESH flag is set (motor stopped), the decision block 236 is executed to determine if the motor 10 is in the "zero throttle" position—that is, if the motor is not being subjected to load torque. If the motor is not in the "zero throttle" position, the last energized phase windings are intermittently energized at a relatively low duty cycle in order to develop sufficient holding torque to prevent normal load torque from changing the rotor position. This operation is referred to herein as a refresh function. The duty cycling during refresh also avoids excessive power consumption and heat generation. The refresh function is skipped if the motor is in its "zero throttle" position.

If the REFRESH flag is set and the motor 10 is holding the throttle 62 at a position other than its rest position, the decision block 238 is executed to determine if all of the phase windings 14a-14c have been deenergized. If so, the instruction block 240 is executed to energize the appropriate phase winding 14a-14c for a predetermined interval t, and to update a motor status indicator accordingly.

If the REFRESH flag is set and the motor 10 is in the "zero throttle position", the instruction block 242 is executed to deenergize the motor phase windings 14a-14c, and to update the motor status indicator accordingly. In addition, the instruction block 244 is executed to deenergize the clutch solenoid coil 66 to disengage the servo clutch if a vehicle overspeed condition is detected at decision block 246.

The interrupt timer adjustment portion 232 comprises the instruction blocks 248-252. The instruction blocks 248 and 252 serve to temporarily interrupt the servicing of further timer interrupts while the instruction block 250 is executed to update the interrupt timer, INT-TIMER. As indicated at instruction block 250, the interval timed by the INT-TIMER is determined according to the difference between a BASE TIME and a time, $TIME_{des}$, related to the desired motor speed, M-SPD-DES so that the interrupt frequency varies in direct relation to the desired motor speed, M-SPD-DES.

As indicated above, the timer interrupts occur four times per motor step. In response to the first and third such interrupts, the controller 32 executes the UPDATE MTR SPD subroutine of FIG. 11 to update the desired motor speed term, M-SPD-DES. In response to the second and fourth such interrupts, the controller 32 executes the MTR CONTROL subroutine of FIGS. 12-14 to appropriately energize the motor phase windings 14a-14c. Referring by way of example to FIG. 6, the first through fourth interrupts for the motor step designated by the interval $t_2-t_4$ occur at times $t_{I1}-t_{I4}$, respectively.

In response to the first interrupt at time $t_{I1}$, the UPDATE MTR SPD subroutine is executed to evaluate the TEST C as described above in reference to FIG. 6 and below in reference to FIG. 11. In response to the second interrupt at time $t_{I2}$, the MTR CONTROL subroutine is executed to determine if a back-EMF zero crossing has occurred in phase winding 14c (for upcoming TEST A), and to deenergize phase winding 14a. In response to the third interrupt at time $t_{I3}$, the UPDATE MTR SPD subroutine is executed to evaluate the TESTS A and B (depending on motor speed) as described above in reference to FIG. 6 and below in reference to FIG. 11. In response to the fourth interrupt at time $t_{I4}$, the MTR CONTROL subroutine is executed to determine if a back-EMF zero crossing has occurred in phase winding 14c (for upcoming TEST C), and to energize the phase winding 14c.

Figure 11:
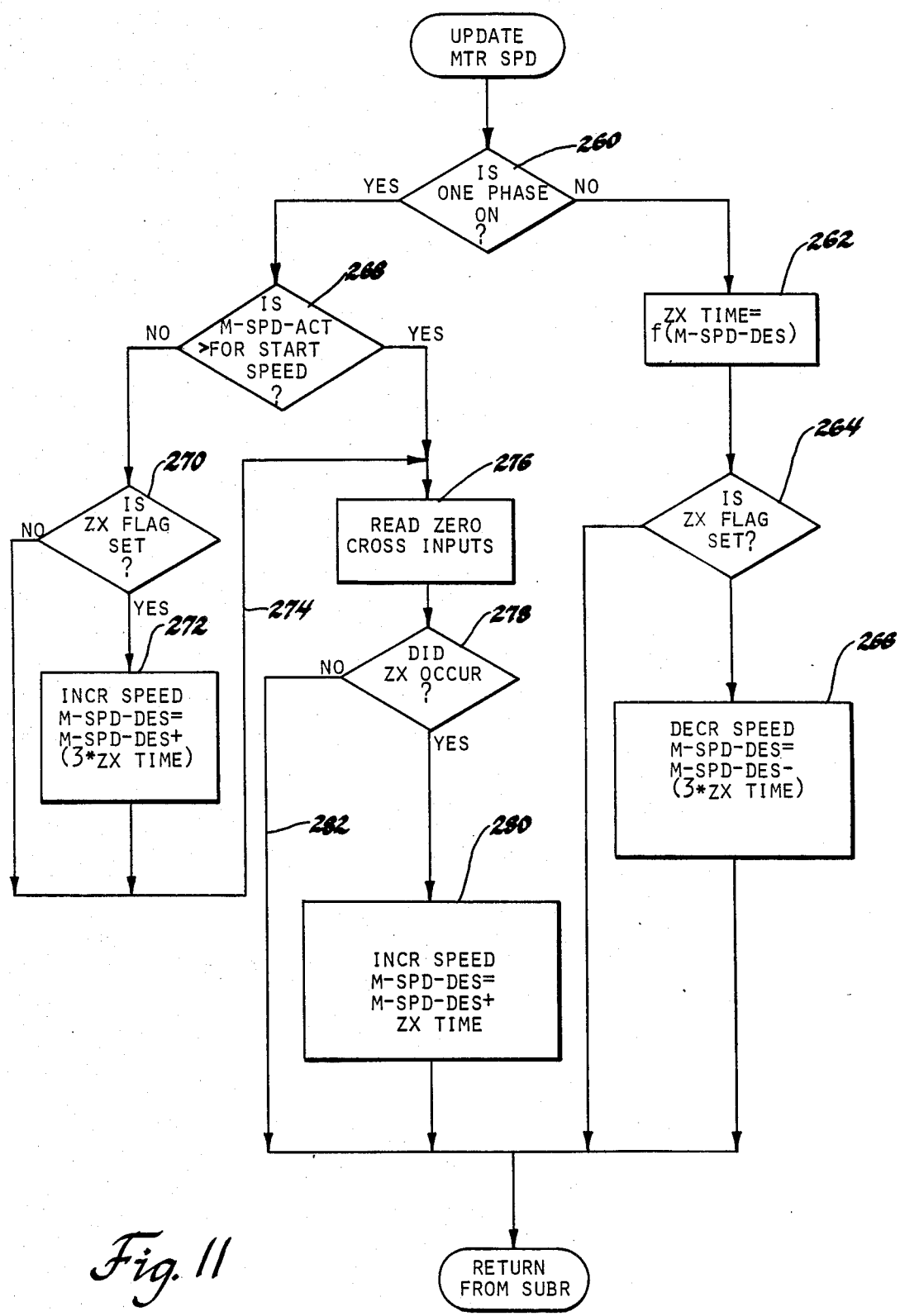

Referring now more particularly to the UPDATE MTR SPD subroutine of FIG. 11, the decision block 260 is first executed to determine if just one motor phase winding is enabled. This may be determined from the motor status indicator referred to above. In the first subroutine execution per motor step, the decision block 260 is answered in the negative, because two phase windings will be on. This may be seen in reference to the Graphs A-C of FIG. 6. At such point, the instruction block 262 is executed to compute a proportional adjustment term, ZX TIME, as a function of the desired motor speed, M-SPD-DES. In the illustrated embodiment, the terms ZX TIME has a value of approximately 1.6% of the desired motor speed as indicated above in reference to FIG. 7. Thereafter, the instruction block 264 is executed to determine if a back-EMF zero crossing occurred prior to the energization of the most recently energized phase winding. This is determined by the status of a ZX flag, such flag being set or reset by the MTR CONTROL subroutine described below. If the ZX flag is set, a zero crossing has occurred, and the controller 32 returns to the interrupt service routine of FIG. 9 without making a desired motor speed adjustment. If the ZX flag is not set, no zero crossing occurred, and instruction block 266 is executed to effect a relatively large decrease in the desired motor speed according to the expression:

M-SPD-DES=M-SPD-DES−(3*ZX TIME)

In the illustrated embodiment wherein the term ZX TIME has a value of approximately 1.6% of the desired motor speed, the TEST C thereby effects a desired motor speed decrease of approximately 4.8%.

When the UPDATE MTR SPD subroutine is subsequently executed in the given motor step, the decision block 260 is answered in the affirmative as only one phase winding will be enabled. This signals the evaluation of TEST A and/or TEST B. If the motor speed is less than or equal to the forward starting speed (50 steps per second in the illustrated embodiment) as determined at decision block 268, both TEST A and TEST B are evaluated. If the motor speed is greater than the starting speed, the evaluation of TEST A is inhibited, and only TEST B is evaluated.

The evaluation of TEST A involves a determination as to whether a back-EMF zero crossing occurred in the phase winding about to be enabled prior to the last timer interrupt. This determination is made by decision block 270, which checks the status of the ZX flag. As indicated above, the ZX flag is set or reset by the MTR CONTROL subroutine in response to a prior timer interrupt. If a zero crossing did occur before the last timer interrupt, the motor speed is much too slow, and the instruction block 272 is executed to effect a relatively large increase in the desired motor speed according to the expression:

$$M\text{-}SPD\text{-}DES = M\text{-}SPD\text{-}DES + (3*ZX\ TIME)$$

In the illustrated embodiment wherein the term ZX TIME has a value of approximately 1.6% of the desired motor speed, the TEST A thereby effects a desired motor speed increase of approximately 4.8%. If the decision block 270 is answered in the negative, the execution of instruction block 272 is skipped as indicated by the flow diagram line 274, and the controller 32 proceeds to evaluate TEST B.

As with TEST A, TEST B involves a determination as to whether a back-EMF zero crossing has occurred in the phase winding about to be enabled. However, the TEST B is concerned with whether the zero crossing has occurred in the interval since the last timer interrupt. This information is not indicated by the status of the ZX flag. Rather, the blocks 276–278 are executed to read the zero crossing inputs supplied to controller 32 by the appropriate phase driver 22–26, and to direct the execution of instruction block 280 if a zero crossing occurred. The instruction block 280 operates to increase the desired motor speed by a relatively small amount according to the expression:

$$M\text{-}SPD\text{-}DES = M\text{-}SPD\text{-}DES + ZX\ TIME$$

In the illustrated embodiment wherein the term ZX TIME has a value of approximately 1.6% of the desired motor speed, the TEST B thereby effects a desired motor speed increase of approximately 1.6%. If a zero crossing did not occur, the execution of instruction block 280 is skipped, as indicated by the flow diagram line 282.

Figure 12:
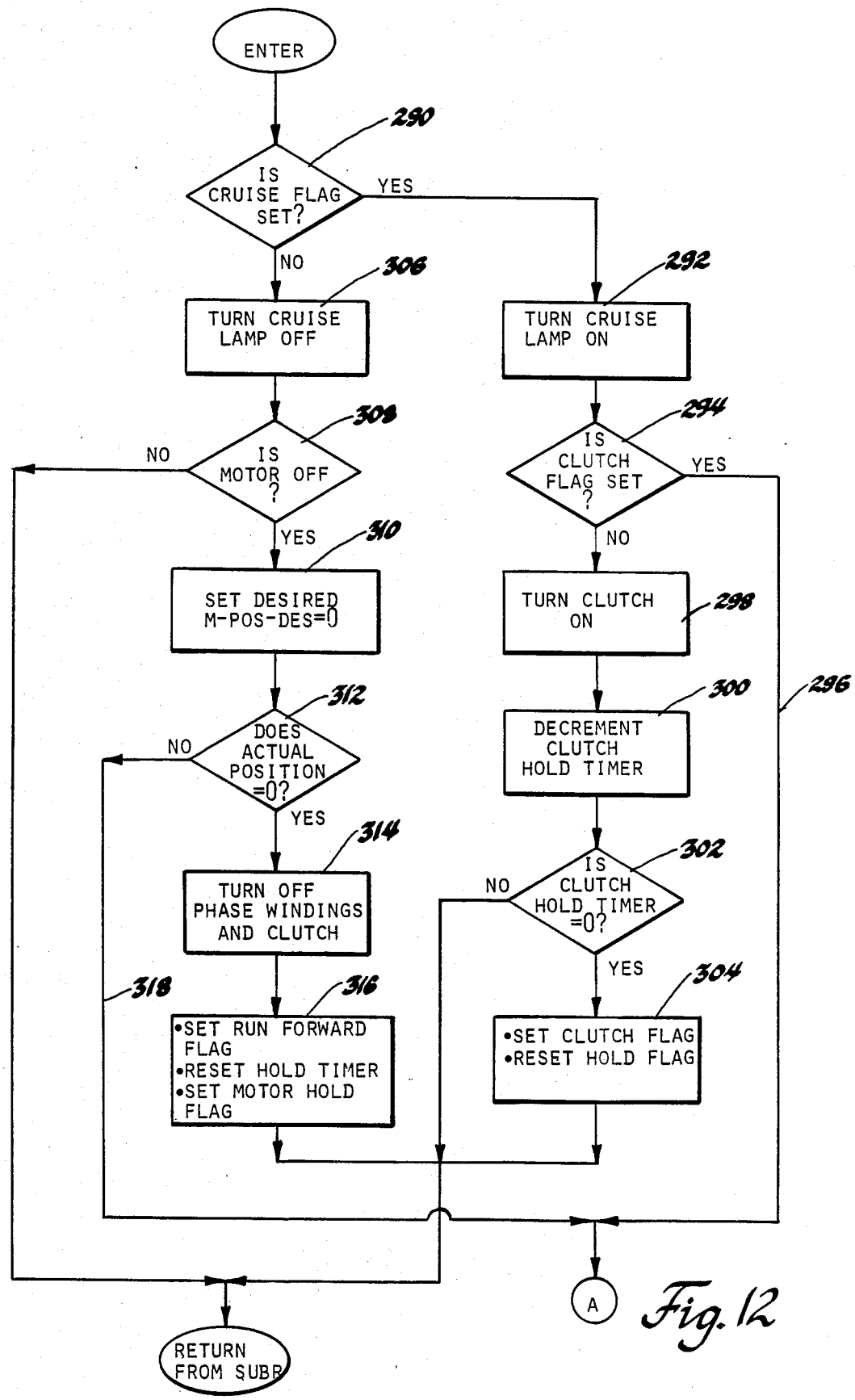
Figure 13:
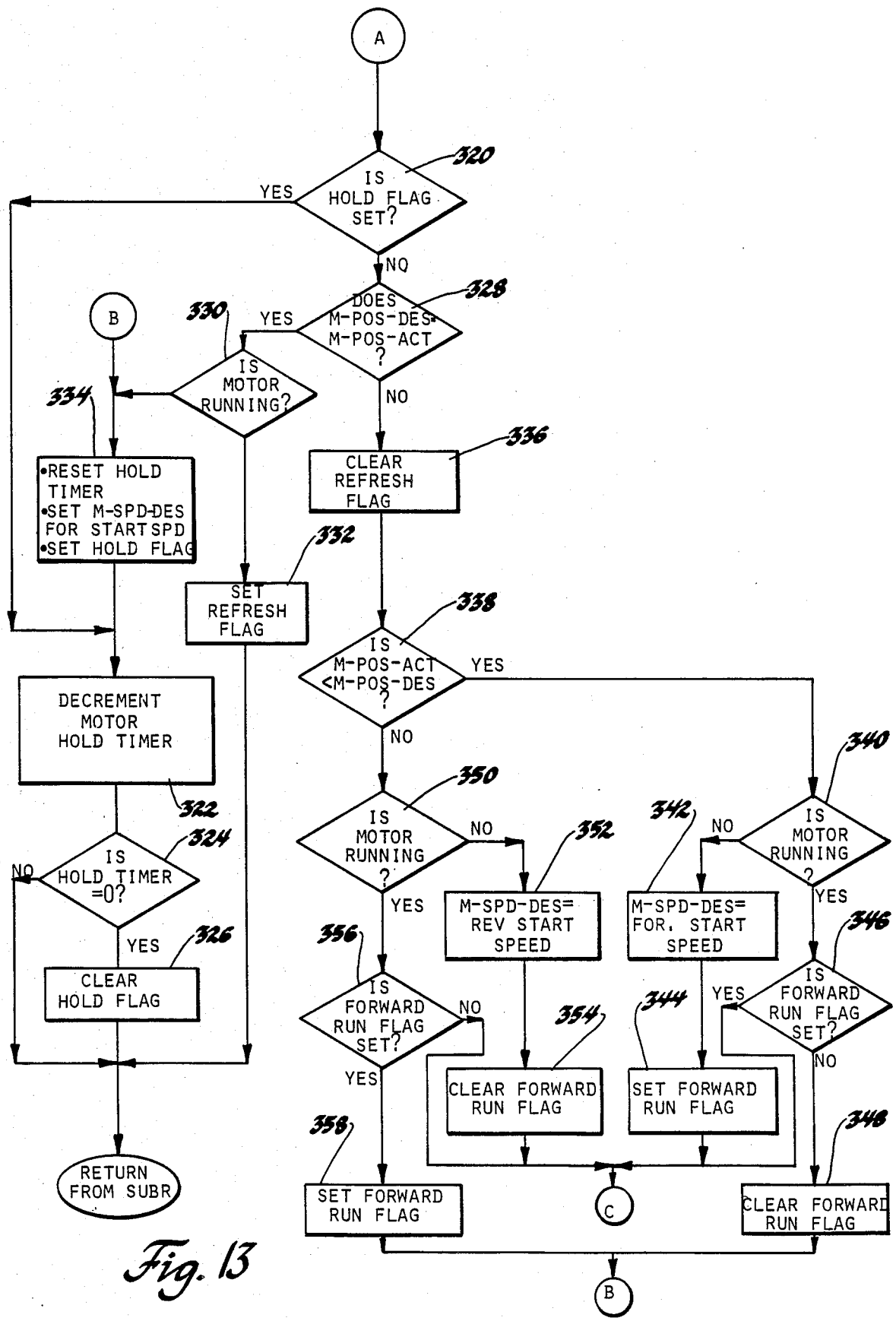
Figure 14:
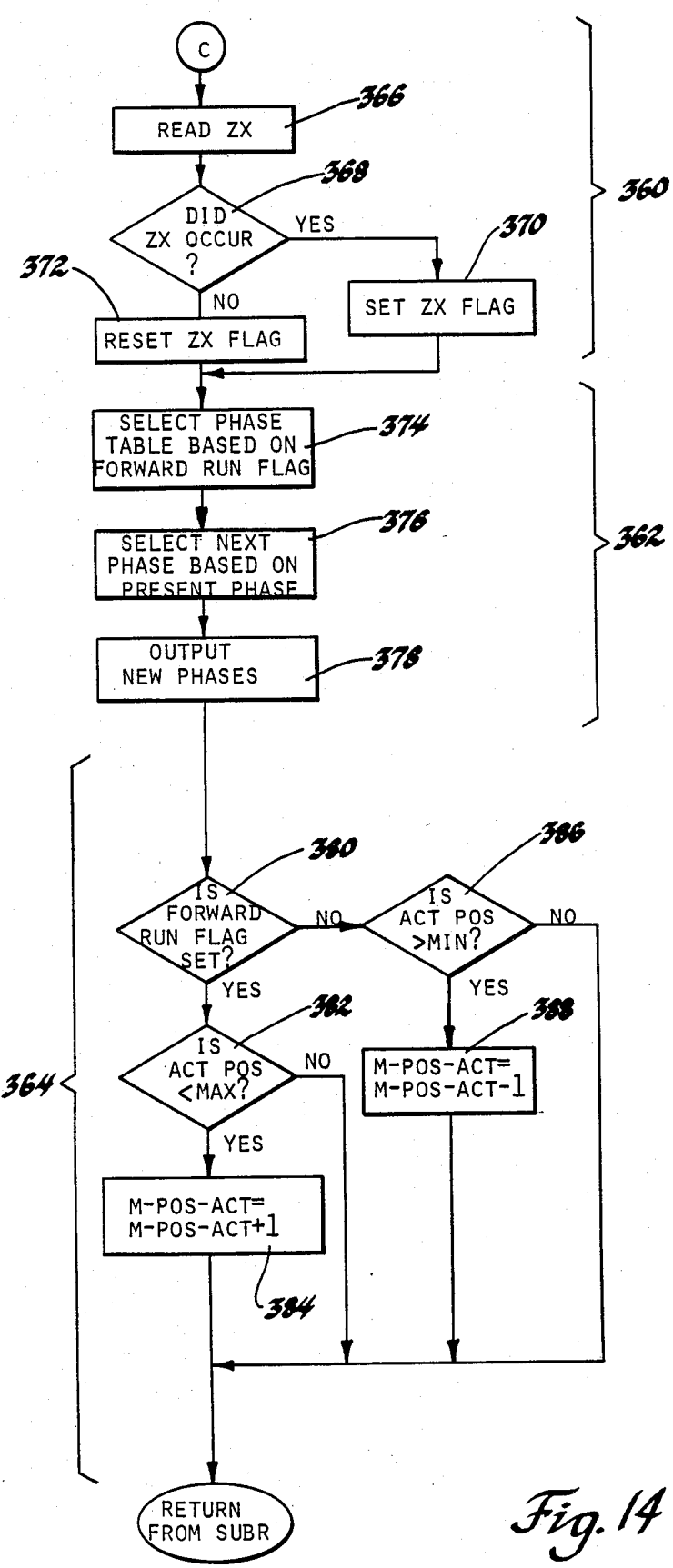

The MTR CONTROL subroutine depicted by the flow diagrams of FIGS. 12–14 serves primarily to appropriately energize the motor phase windings 14a14c and the clutch solenoid coil 66, and to check for the occurrence of back-EMF zero crossings. FIG. 12 relates primarily to clutch control logic; FIG. 13 relates primarily to motor starting logic; and FIG. 14 relates primarily to motor control, zero crossing detection and status updating. As indicated above in reference to the interrupt service routine of FIG. 9, the MTR CONTROL subroutine is executed twice per motor step, at alternate timer interrupts.

The flow diagram of FIG. 12 includes logic for engaging and disengaging the control of engine throttle 62. The CRUISE flag is set or reset by the background program of FIG. 8 in accordance with status of the input switches 72, 78, 84 and 90 to indicate whether vehicle speed control is active.

If vehicle speed control is active, the decision block 290 is answered in the affirmative, and the instruction block 292 is executed to light the indicator lamp 190. Then, the decision block 294 is executed to determine if the clutch of gearset and clutch assembly 60 has been engaged for at least a hold period, as indicated by the status of the CLUTCH flag. If so, the controller 32 proceeds to the motor starting logic of FIG. 13, as indicated by the flow diagram line 296. If the clutch has not been engaged for at least a hold period, the instruction blocks 298–300 are executed to energize the clutch solenoid coil 66 and to decrement a count previously stored in a timer referred to herein as CLUTCH HOLD TIMER. Until the count in CLUTCH HOLD TIMER is decremented to zero, as determined by the decision block 302, the controller 32 is returned to the interrupt service routine of FIG. 9. When the interval counted by the CLUTCH HOLD TIMER has elapsed, the instruction block 304 is executed reset the HOLD flag and to set the CLUTCH flag, indicating that the clutch has been engaged for at least the hold period. Thereafter, the controller 32 is returned to the interrupt service routine, and the subroutine does not enable phase winding energization.

If vehicle speed control is not active, the decision block 290 is answered in the negative, and instruction block 306 is executed to extinguish the indicator lamp 190. If the motor 10 is off (no phase windings enabled), as determined at decision block 308, the throttle 62 has been released, and controller 32 is returned to the interrupt service routine. If the motor 10 is on, the blocks 310–312 are executed to set the desired motor position, M-POS-DES, to zero, and to determine if the motor has actually returned to the "zero throttle" position. If so, the instruction blocks 314–316 are executed to disable the phase windings 14a–14c and the solenoid coil 66, to set a RUN FORWARD flag, to store a predetermined count in a MOTOR HOLD TIMER, and to set a MOTOR HOLD flag. As described below, the MOTOR HOLD TIMER is used to prevent motor operation for a predetermined interval any time the motor direction of rotation is reversed, and the HOLD flag indicates whether the hold mode is in effect. If the motor 10 has not yet attained the "zero throttle" position, the controller 32 proceeds to the motor starting logic of FIG. 13, as indicated by the flow diagram line 318.

As indicated above, the flow diagram of FIG. 13 relates primarily to motor starting logic. The block 320 is first executed to determine if the motor 10 is in the hold mode, as indicated by the status of the HOLD flag. As explained in reference to FIG. 12, the MOTOR HOLD TIMER is initialized to a predetermined count whenever the desired direction of motor rotation is reversed. If the hold mode is in effect, decision block 320 is answered in the affirmative, and the instruction block 322 is executed to decrement the MOTOR HOLD TIMER. When the MOTOR HOLD TIMER has been decremented to zero, as determined by the decision block 324, the instruction block 326 is executed to clear the HOLD flag. Thereafter, the controller 32 is returned to the interrupt service routine of FIG. 9.

If the motor 10 is not in the hold mode, decision block 320 is answered in the negative, and the decision block 328 is executed to determine if the actual motor position (M-POS-ACT) is equal to the desired motor position (M-POS-DES). If so, decision block 330 is executed to determine if the motor 10 is running. If the motor is not running, instruction block 332 is executed to set the REFRESH flag so that the refresh portion 230 of the interrupt service routine (FIG. 10) will be activated in response to the next timer interrupt. As described above, the refresh routine serves to duty cycle the last enabled phase windings for developing holding torque which maintains the position of throttle 62. If the motor is running, the instruction block 334 is executed to set the desired motor speed M-SPD-DES equal to the forward starting speed of 50 steps per second for slowing the motor to a stop, to initialize the MOTOR HOLD TIMER, and to set the HOLD flag. Thereafter, the blocks 322-326 are executed to time the hold interval described above.

If it is determined at decision block 328 that the actual motor position does not correspond with the desired motor position, the instruction blocl 336 is executed to clear the REFRESH flag, and the decision block 338 is executed to determine the required direction of motor rotation. If the actual position is less than the desired position, the motor must be operated in the forward direction to open throttle 62. If the actual position is greater than the desired position, the motor must be operated in the reverse direction to close throttle 62.

If motor operation in the forward direction is required, the decision block 340 is executed to determine if the motor is running. If the motor is not running, the instruction blocks 342-344 are executed to initialize the desired motor speed M-SPD-DES at the forward starting speed of 50 steps per second set the FORWARD RUN flag before proceeding to the flow diagram of FIG. 14. If the motor is running and the FORWARD RUN flag is set, as determined at decision block 346, the motor is operating in the correct direction and the controller 32 proceeds to tne flow diagram of FIG. 14. If the FORWARD RUN flag is not set, the motor is operating in the wrong direction, and the instruction block 348 is executed to clear the FORWARD RUN flag. Then, the blocks 334 and 322-326 are executed as indicated by the circled letter B to stop the motor and initiate a motor hold mode.

If motor operation in the reverse direction is required, the decision block 350 is executed to determine if the motor is running. If the motor is not running, the instruction blocks 352-354 are executed to initialize the desired motor speed M-SPD-DES at the reverse starting speed of 100 steps per second, and to clear the FORWARD RUN flag before proceeding to the flow diagram of FIG. 14. If the motor is running and the FORWARD RUN flag is not set, as determing decision block 356, the motor is operating in the correct direction and controller 32 proceeds to the flow diagram of FIG. 14. If the FORWARD RUN flag is set, the motor is operating in the wrong direction, and the instruction block 358 is executed to set the FORWARD RUN flag. Then, the blocks 334 and 322-326 are executed as indicated by the circled letter B to stop the motor and initiate a motor hold mode.

The flow diagram of FIG. 14 includes a zero crossing detection portion 360, a phase winding energization portion 362, and a motor status portion 364. The zero crossing detection portion includes the blocks 366-372, and serves to read the zero crossing inputs supplied by phase drivers 22-26, to set the ZX flag if a back-EMF zero crossing occurred, an the ZX flag if no zero crossing occurred. The phase winding energization portion 362 includes the blocks 374-378, and serves to select the phase windings to be energized based on previously stored look-up table information, and to suitably control the phase drivers 22-26. The motor status portion 364 includes the blocks 380-388, and serves to update the actual motor position indicator, M-POS-ACT, in accordance with the new winding energization. If the FORWARD RUN flag is set (as determined at decision block 380), and the term M-POS-ACT indicates a position less than an upper limit position MAX (as determined at decision block 382), the instruction block 384 is executed to increment M-POS-ACT. Similarly, if the FORWARD RUN flag is not set, and the term M-POS-ACT indicates a position greater than a lower limit position MIN (as determined at decision block 386), the instruction block 388 is executed to decrement M-POS-ACT. Thereafter the controller 32 is returned to the interrupt service routine of FIG. 9.

In the manner described above, the motor speed is adaptively adjusted in accordance with load torque variations so as to maximize the motor speed (and therefore the speed of response of the throttle operator) while retaining the ability to respond to some load torque variation without loss of synchronism. The speed adjustments are made both during starting and running operation so as to accelerate the motor to its steady state running speed as fast as the load torque will permit without loss of synchronism.

As indicated above, this invention has been described herein in reference to the illustrated embodiment wherein timed interrupts occur in synchronism with the motor operation, and the zero crossing error is evaluated at discrete intervals defined by the interrupts for effecting a motor speed adjustment if necessary. As also indicated above, the adaptive speed adjustment of this invention may be carried out with a system wherein interrupts occur in response to the detection of back-EMF zero crossings. In such a system, the zero crossing error is determined at each such interrupt, and a speed adjustment is effected in proportion thereto.

Obviously, other modifications will occur to those skilled in the art, and it should be understood that systems incorporating such modifications may fall within the scope of this invention, which is defined by the appended claims.

The embodiments of the invention in which an exclusive property or privilege is claimed are defined as follows:

1. An electrical servo system for positioning a mechanical load, the system including a stepper motor having a plurality of stator windings adapted to be energized in predetermined sequence to develop a rotating stator magnetic field, a permanent magnet rotor drivingly connected to the load and having a magnetic field which tends to rotate in synchronism with the stator magnetic field, and a controller for sequentially energizing the motor stator windings at a rate determined in accordance with a motor speed command to rotatably drive the rotor for positioning the load in accordance with a position command, a method of operation comprising the steps of:

initializing the motor speed command to a predetermined starting rate at the initiation of motor operation; and thereafter during the energization of each phase winding, detecting a crossing of the back-EMF voltage in the stepper motor phase winding about to be energized, the point at which such crossing occurs being related to the degree of misalignment between the magnetic fields of the rotor and stator;

determining a motor speed correction in relation to the amount by which the detected crossing deviates from a desired crossing corresponding to an empirically derived amount of misalignment which permits the motor to withstand a predetermined level of variation in the torque which opposes motor rotation without substantial loss of synchronism between the rotor and stator magnetic fields; and adjusting the motor speed command in relation to said motor speed correction so as to drive the actual crossing into correspondence with the desired crossing, whereby the motor speed is adaptively controlled in accordance with the torque it must overcome, and the motor speed is maximized for reliable operation under all load conditions.

2. The method set forth in claim 1, wherein said predetermined level of variation in the torque which opposes motor rotation is determined in relation to the speed of response of the motor speed command adjustments.

3. The method set forth in claim 1, wherein the mechanical load comprises the throttle of a vehicle engine and a return spring which biases the throttle to a closed position, and wherein the step of initializing the motor speed command at the initiation of motor operation includes the steps of:

setting the motor speed command at a minimum, relatively low value when the motor is stopped and the error between the commanded and actual throttle positions requires that the motor effect a throttle adjustment which opposes the bias of the return spring; and setting the motor speed command at a minimum, relatively high value when the motor is stopped and the error between the commanded and actual throttle positions requires that the motor effect a throttle adjustment which aids the bias of the return spring.

4. The method as set forth in claim 1, wherein the mechanical load is the throttle of a motor vehicle engine, and the position command represents a throttle position for bringing the actual speed of the vehicle into correspondence with a desired speed.

5. The method set forth in claim 1 wherein the stator windings are connected in a WYE configuration, and wherein detecting the crossing of the back-EMF voltage includes the steps of:

defining a reference voltage in relation to the voltage at the common point of the stator winding configuration; and comparing the stator winding back-EMF voltage with said reference voltage to detect its coincidence therewith.

6. An electrical servo system for positioning a mechanical load, the system including a stepper motor having a plurality of stator windings adapted to be energized in predetermined sequence to develop a stator magnetic field which rotates step-by-step, a permanent magnet rotor drivingly connected to the load and having a magnetic field which tends to rotate in synchronism with the stator magnetic field, and a controller for sequentially energizing the motor stator windings to rotatably drive the rotor for positioning the load in accordance with a position command, apparatus comprising:

back-EMF detection means for detecting the crossing of the back-EMF voltages in the various stepper motor phase windings, the point at which such crossing occurs being related to the degree of misalignment between the magnetic fields of the rotor and stator; and means including controller means activated a predetermined number of times in each motor step, such means being effective when activated to determine whether a back-EMF neutral voltage crossing has been detected by said back-EMF detection means, and to adjust the motor speed command in accordance with the result of said determination so that following the adjustment, the back-EMF neutral voltage crossing of a stator winding about to be energized will tend to occur at a desired point in the the motor step defined by the preceding stator winding energization, said desired point corresponding to an empirically derived amount of misalignment which permits the motor to withstand a predetermined level of variation in the torque which opposes motor rotation without substantial loss of synchronism between the rotor and stator magnetic fields, whereby the motor speed is adaptively controlled in accordance with the torque it must overcome, and the motor is maximized for reliable operation under all load conditions.

7. The apparatus set forth in claim 6, wherein the magnitude of correction is scheduled in relation to the deviation of the detected point of back-EMF neutral voltage crossing from the desired point.

8. The apparatus set forth in claim 6, wherein the controller means is activated in response to a scheduled interrupt a predetermined number of times per motor step to define a predetermined number of substantially equal duration motor step intervals, and wherein the onset of one such motor step interval substantially coincides with the desired point of back-EMF neutral voltage crossing of the stator winding about to be energized.

9. The apparatus set forth in claim 8, wherein the controller means is effective in a motor step interval preceding said one motor step interval to increase the motor speed command if a back-EMF neutral voltage crossing for the stator winding about to be energized has already been detected by said back-EMF detection means.

10. The apparatus set forth in claim 8, wherein the controller means is effective in a motor step interval following said one motor step interval to decrease the motor speed command if a back-EMF neutral voltage crossing for the stator winding about to be energized has not yet been detected by said back-EMF detection means.

* * * * *